Patented Mar. 14, 1939

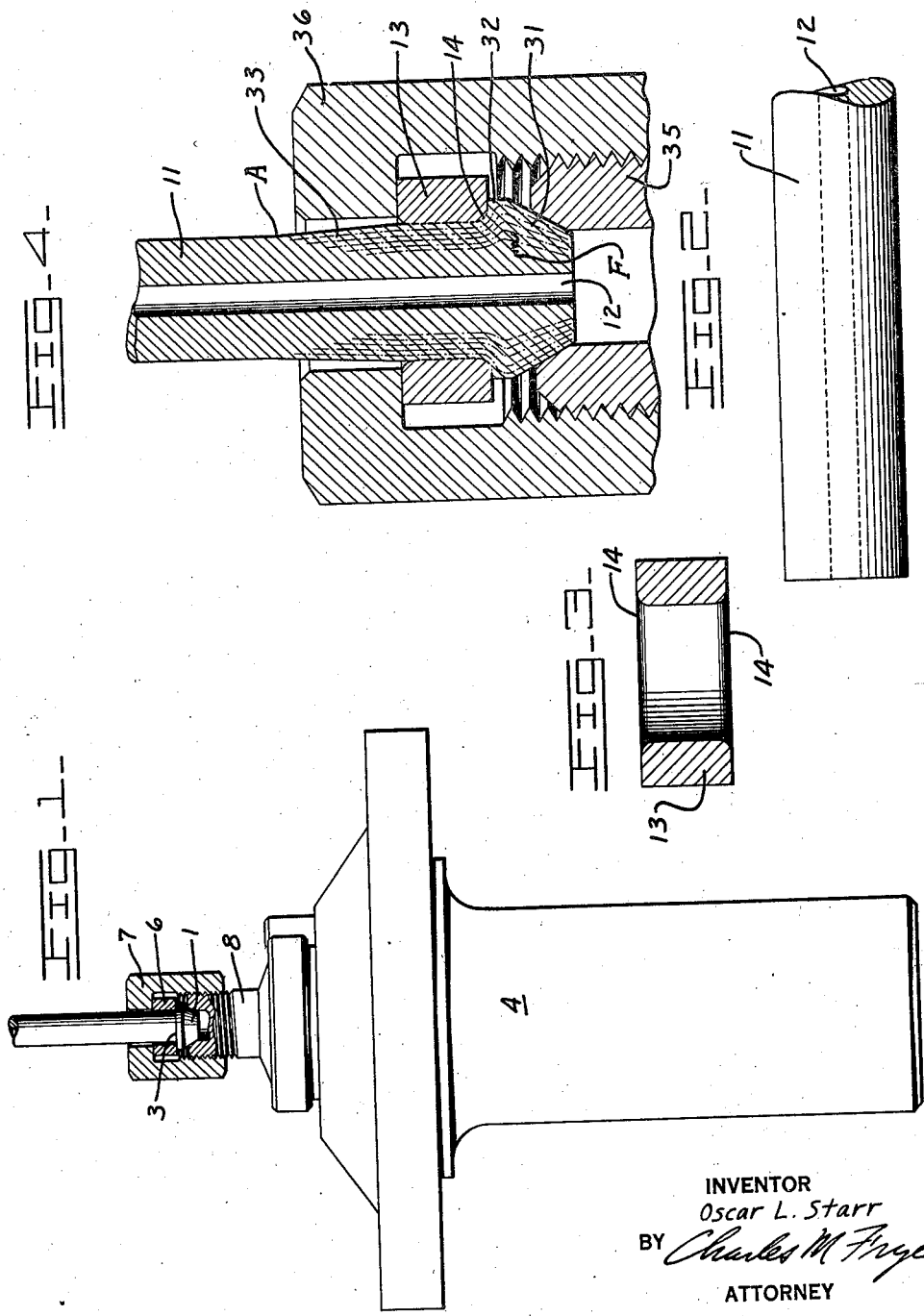

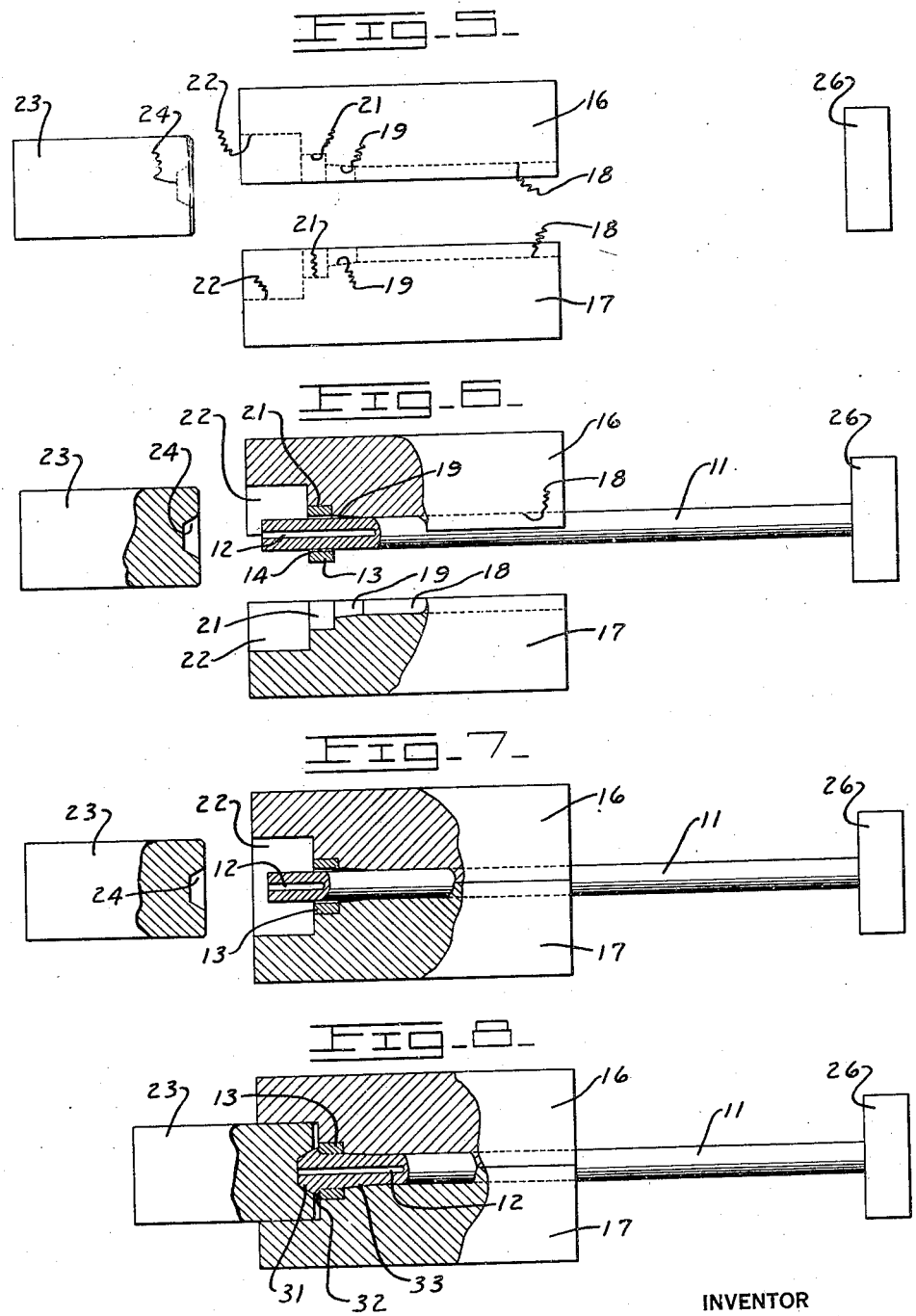

2,150,524

UNITED STATES PATENT OFFICE 2,150,524

FITTING AND METHOD OF MAKING SAME

Oscar L. Starr, Mission San Jose, Calif., assignor to Caterpillar Tractor Co., San Leandro, Calif., a corporation of California Application July 2, 1935, Serial No. 29,528

7 Claims. (Cl. 29—157)

My invention relates to a compression fitting, and more particularly to a type of fitting adapted for use with tubing or pipe through which fluid flows under comparatively high pressure, as, for example, tubing employed for conveying fuel from a high pressure fuel injection pump to an associated fuel injection nozzle of a compression ignition and the like engine, such as a Diesel engine.

Heretofore, such tubing, as is illustrated by Fig. 1 has been formed with a fitting comprising an upset enlarged head 1 integral with the tubing proper and forming shoulder 3 at the junction of the head with the body of the tubing. The head has a frusto-conical or tapered surface forming a male member adapted to fit in a complementary female member or conically shaped seat or recess formed in the part to which the tubing is to be connected; such part being shown, for example as a fuel injection pump 4 mounted on a compression ignition or Diesel engine. A ferrule or abutment flange 6 is adapted for positioning over the tubing after the head is formed, and has a loose fit about the tubing to facilitate positioning thereover. Such ferrule or flange bears against shoulder 3; and the entire assembly is clamped together by nut 7 abutting ferrule 6 and screwed onto nipple 8 on the part to which the tubing is connected.

In an environment of the character related, vibrations of the machine are transmitted to the tubing. Hence, the tubing is caused to vibrate. Vibration of the tubing results in relative movement in a transverse direction, by virtue of the loose fit of ferrule 6 about the tubing, between the tubing and the ferrule, thus placing a tremendous strain on the tubing along the plane of contact or abutment of head 1 with ferrule 6. As a result, breakage frequently has occurred at the location pointed out, resulting in leakage of fluid, thus rendering the tubing useless.

The present invention is designed to overcome the above described difficulty; and it, therefore, has as objects, among others, the provision of an improved:

(1) Compression fitting, of the character related, which is of strong construction, capable of withstanding breakage which might otherwise be caused by vibration of the tubing; and (2) Which is of economical construction and easy to make.

Other objects of the invention will become apparent from a perusal of the following description thereof.

In general, the improved fitting of my invention comprises the provision of a substantially molecular union or tight press-fit of the flange or ferrule to the body of the tubing or tubular member and adjacent the head on such member. The portion of the tubing adjacent the head and surrounded by the ferrule is formed with an enlarged or thickened wall portion; the enlarged portion tapering inwardly from adjacent the ferrule. Thus, a reenforcing shank portion is formed adjacent the head for distribution of vibration stresses away from the head.

The fitting is preferably formed by utilizing a length of tubing of constant diameter throughout, and placing thereover adjacent an end thereof an initially preformed ferrule having an inside diameter larger than the outside diameter of the tubing so as to have a loose fit over the tubing. The head, the enlarged or thickened wall portion of the tubing and the rigid substantially molecular union of the ferrule or flange to the tubing, are all preferably simultaneously effected by applying pressure on the end of the tubing adjacent the ferrule. This effects a flow of metal to thus provide the thickened wall reenforcing portion and the union pointed out.

Reference will now be made to the drawings for a more detailed description of the invention, in which drawings:

Fig. 1, previously referred to, is a vertical sectional elevation illustrating a type of environment in which the fitting of my invention may be used. For purposes of explanation, Fig. 1 shows an old type of fitting wherein the ferrule or abutment flange, for the securing nut, has a loose fit about the tubing and is placed over the tubing after the head is formed.

Fig. 2 is an enlarged elevation of an end of a piece of tubing, before formation of the fitting thereon by the preferred method of my invention.

Fig. 3 is an enlarged vertical section through a ferrule adapted to be loosely fitted over the tubing, before formation of the fitting by the preferred method of my invention.

Fig. 4 is an enlarged vertical sectional view illustrating the completed fitting of my invention; the dotted lines in the view being for the purpose of indicating the planes of rigid union between the ferrule and the tubing, and the broken lines indicating the metal flow lines resulting from formation of the fitting by the preferred method of my invention. The view illustrates connection of the fitting to another part.

Fig. 5 illustrates schematically, in top plan view, a type of apparatus by which the fitting of my invention may be formed by the preferred method.

Figs. 6 through 8 are fragmentary sectional schematic views illustrating various stages of the formation of the fitting by the apparatus of Fig. 5.

In greater detail, the tubular body or tubing 11, as shown in Fig. 2, is initially of constant diameter throughout, and is made of more or less soft and ductile steel having a small diameter bore 12. However, any other kind of relatively soft metal tubing, such as copper tubing, may have the fitting of my invention provided thereon. Such tubing may be employed with any suitable mechanisms or machines, besides for the purpose of conveying fuel to engines. Ferrule 13, as shown in Fig. 3, is of relatively hard metal, and has an inside diameter larger than the outside diameter of tubing 11; so that when the ferrule is positioned over the tubing it fits loosely thereon to provide an annular space into which metal of the tubing can be subsequently caused to flow when the end of the tubing is compressed, to effect the tight fit previously related, by the preferred method of my invention. Inside edges 14 of the ferrule are each rounded to provide fillets for a purpose to be subsequently explained.

In the preferred method of construction, the head of the fitting on the tubing and the tight fit between the ferrule and the tubing are both simultaneously effected, after the ferrule is positioned over the tubing adjacent an end thereof. Reference will be made to Figs. 5 through 8 in the following description of the preferred method for formation of the fitting. Any suitable apparatus may be employed. I have illustrated schematically an apparatus comprising a split die including fixed die member 16, and die member 17 movable laterally with respect to die member 16. Each of the die members has a semi-cylindrical passage 18; the passages 18, when the dies are brought together as shown in Fig. 7, forming a tubular passage of the same diameter as tubing 11 which is to be provided with the fitting, so as to provide for clamping of the tubing in a fixed position during formation of the fitting.

Each passage 18 terminates in a tapered semi-frusto-conical recess portion 19 leading into an enlarged semi-cylindrical shaped recess 21 for receiving ferrule 13; the recess 21 communicating with a further enlarged semi-cylindrically shaped recess 22 into which punch 23 is adapted to enter when the fitting is to be formed. Punch 23 is formed in the end thereof facing the die, with a frusto-conical recess 24 for effecting the complementary shape on the head of the fitting. Stop 26 provides means against which an end of the tubing may be abutted, and is preferably adjustably mounted to adapt the machine for tubing of varying lengths.

Tubing 11 of a length selected for any particular job is first positioned in passage 18 of stationary die member 16, as shown in Fig. 6, with an end thereof abutting stop 26, the stop 26 being preadjusted to a proper position determining correct formation of the fitting. Ferrule 13 is then slipped over the end of the tubing upon which the fitting is to be formed, and is seated in recess 21. Next, die member 17 is moved laterally against die member 16 to clamp rigidly and hold tubing 11 in position, together with ferrule 13 (Fig. 7). Finally, punch 23 is forced into the cylindrical recess formed by recesses 22 when the die members 16 and 17 are brought together; and as is illustrated in Fig. 8, the punch is moved into the cylindrical recess a proper distance so as to cause formation or upsetting of frusto-conically surfaced head 31 and its shoulder 32. Because of the pressure applied to the end of the tubing 11, which is effected by movement of the punch during the described cold press-fitting operation, the metal of the tubing surrounded by ferrule 13 is caused to flow into a rigid and substantially molecular union with the ferrule. Furthermore, metal is also caused to flow into the frusto-conical recess formed by recessed parts 19 of the die, to provide the enlarged tapered shank portion 33. After formation of the fitting, the die members 16 and 17 are relatively moved apart, the punch 23 withdrawn, and the tubing with the fitting formed thereon removed. Should the end of the bore 12 of the tubing become distorted by virtue of the formation of the fitting, it may be readily cleaned out by a simple drilling operation.

Fig. 4 illustrates, on an enlarged scale, the completed fitting of the preferred construction. It will be noted that a portion of the tubing has an enlarged or thickened wall portion beyond point A which is located well ahead of ferrule 13; and that from the ferrule to point A, the shank portion 33 has a gradual inward taper. Because of the cold press-fitting of ferrule or flange 13 onto the tubing during simultaneous formation of the conically tapered head 31, the ferrule in effect has a rigid substantially integral union with the enlarged portion of the tubing and with the shoulder 32 of head 31. As was previously pointed out, the inner edges 14 of ferrule 13 are provided with rounded fillets. This is for the purpose of facilitating union between shoulder 32 and the ferrule edge adjacent the shoulder to minimize cracking or breakage at this point. A unitary structure of the ferrule or flange, the tubing and the head thus obtains. Because, each of the edges 14 has the fillets, it becomes immaterial which edge is faced inwardly of the die, thus making it unnecessary for the workman to take up time in effecting proper positioning of the ferrule in the die which would arise if only one edge were provided with the fillet.

As was previously related, the tubing is of relatively soft and ductile metal. Consequently, it may be readily bent or flexed when desired. Also, the softness of the metal enables the tapered part of head 31 or male member, when the fitting is clamped under pressure to part 35 by means of the usual nut or securing means 36, to conform exactly to the shape of the female member or seat or recess in part 35 for the provision of a leak proof connection. Because ferrule or flange 13 is of relatively hard metal, it will not become deformed by the pressure necessary to secure the fitting. Nut 36 is also of hard metal. Consequently, when the nut is turned to clamp the fitting tightly, the hard contacting surfaces of the nut and the ferrule will offer minimum frictional resistance, to preclude twisting and deformation of soft head 31, which might otherwise occur if the ferrule or flange were omitted and the hard nut were turned in direct contact with soft shoulder 32 of the head. In one embodiment of the invention in use in engines manufactured by my assignee, the tubing is of cold drawn seamless steel, annealed for ductility and having a hardness of Rockwell B30 to B50; the ferrule is of annealed cold finished steel having a hardness of Rockwell C42 to C50; and the nut is of cold finished steel having a hardness of Rockwell C30–C35.

No relative movement can exist between ferrule or flange 13 and the tubing 11. As a result, any vibrations transmitted to the tubing will not cause breakage of the tubing along the plane of union between shoulder 32 and ferrule 13. Also, the enlarged portion of the tubing within ferrule 13 and the enlarged tapered shank 33 provide reenforcing means for withstanding forces tending to effect breakage at the point noted; and because of the tapered shank 33 such forces are evenly distributed to the body of the tubing to thereby prevent concentration of vibration forces at one location. Strain is, thus, reduced to a minimum.

The flow of metal, resulting from the compression effected by the preferred method of my invention, creates internal changes in the enlarged portion of the fitting, also contributing toward strength of construction. Metal flow lines are created which, instead of extending parallel to the axis of the tubing as existed in the cold drawn tubing before formation of the fitting thereon, extend or bulge radially outwardly from such axis, as is indicated by broken lines F in Fig. 4. This provides at the junction of ferrule 13 and head 31, a metal grain facing the direction of transmission of vibration stresses to the fitting to withstand better such stresses.

Although I have chosen, for the purposes of illustration, the tube fitting employed in a fuel injection line for a Diesel engine, it is apparent that the fitting of my invention may be employed for any other purpose when it is desired to prevent breakage at the junction where the fitting is secured. Also, any other means, other than that schematically illustrated, may be employed for forming the fitting, so as to obtain the rigid union or press-fit between the ferrule and the tubing. For example, the head could be machined from tubing stock, and the ferrule then tightly press-fitted over the body of the tubing adjacent the head. This method is not as desirable as my preferred method because it is more expensive, and does not produce the advantages resulting from flow of metal previously discussed. If desired, the method in which flow of metal is utilized, could even be performed by hand in a more or less crude manner. For example, a length of tubing could be clamped in a vise and the ferrule loosely fitted thereover to abut an end of the vise. Such ferrule could then be held with pliers; and a punch could be applied to the end of the tubing to form the head and compress the tubing so as to effect rigid union therewith with the ferrule.

The method described herein is preferred because of its economy, and also because the flow of metal resulting therefrom makes for a more efficacious and tight fit between the ferrule or abutment flange and the tubing.

Because of the cold upsetting of the end of the tubing, there is no formation of scale on the inner walls of the tubing, which would otherwise occur in a method employing heat. Such scale is undesirable because it becomes loosened in time, and finds its way, in the case of a compression ignition engine, to the fuel injection valve, causing damage thereto.

I, therefore, claim as my invention:

1. As an article of manufacture, a compression fitting comprising a preformed unitary structure formed of integrally united parts which include a soft metal tubular body having an upset head, a thickened inwardly tapered reenforcing wall portion adjacent said head, and a hard metal ferrule press-fitted into a rigid non-threaded substantially permanent molecular union with the head and the thickened wall portion.

2. In the method of forming as an article of manufacture a compression fitting having a tubular body portion formed with a head and a ferrule adjacent said head, the steps which comprise employing as the body portion a tubular member which is originally without the head, and forming the head with the ferrule in position about said body portion so as to effect flow of metal to cause a rigid substantially permanent molecular union between said head, said body portion and said ferrule.

3. The method of constructing as an article of manufacture a compression fitting from a tubular member which is originally without a head, and a preformed ferrule adapted to fit loosely over said member; comprising placing the ferrule adjacent an end of said member; and applying pressure to such end to effect formation of the head, and flow of metal for effecting substantially rigid and permanent molecular union between said ferrule and said member.

4. As an article of manufacture, a compression fitting comprising a preformed unitary structure formed of integrally united parts which include a tubular body having a head forming an annular shoulder projecting from said body substantially at a right angle to the axis thereof, and a ferrule in rigid press-fit substantially permanent molecular union with both the body and the shoulder, the inner edge of said ferrule which engages said shoulder being rounded.

5. As an article of manufacture, a compression fitting comprising a preformed unitary structure formed of integrally united parts which include a comparatively soft metal tubular body having a reenforcing wall portion of increased thickness formed by flow of metal, and a conically shaped head adjacent said wall portion; and a harder metal ferrule having a rigid press-fit flow of metal substantialy permanent union with both said head and said body wall portion of increased thickness, said wall portion of increased thickness and said head having metal flow lines extending outwardly with respect to the axis of said tubular body to reenforce the structure.

6. As an article of manufacture, a compression fitting comprising a preformed unitary structure formed of integrally united parts which include a relatively soft metal tubular body having an axially extending passage and a conically shaped head upset adjacent an end of the body for reception within a complementary shaped female member to which the head is adapted for connection, said head having a wall thickness materially greater than that of said body, the portion of said passage through the head being of substantially the same diameter as the portion of said passage within the body, and a harder metal ferrule about said body adjacent said head, the metal of the head and the portion of said body adjacent said head being deformed and expanded into a substantially permanent flow of metal molecular union with said ferrule whereby the fitting including the ferrule is mountable in and removable from couplings as an integral unit.

7. The method of forming as an article of manufacture a compression fitting of the type having a relatively soft union-effecting head portion and a harder thrust-receiving securing portion, comprising positioning a tube of relatively soft deformable metal, applying a ferrule of harder metal loosely about one end of said tube, and applying pressure longitudinally to the ferrule-encircled end of the tube to shape a union head thereon and simultaneously to thicken the metal at said end to engage in and form a substantially permanent molecular union with said ferrule so that the fitting including the ferrule is mountable in and removable from couplings as an integral unit.

OSCAR L. STARR.